(12) United States Patent
Nishi et al.

(10) Patent No.: US 12,630,733 B2
(45) Date of Patent: May 19, 2026

(54) POWDER DISPERSION AND METHOD FOR PRODUCING COMPOSITE

(71) Applicant: AGC INC., Tokyo (JP)

(72) Inventors: Mai Nishi, Tokyo (JP); Tatsuya Terada, Tokyo (JP); Tomoya Hosoda, Tokyo (JP); Wataru Kasai, Tokyo (JP)

(73) Assignee: AGC INC., Tokyo (JP)

( * ) Notice: Subject to any disclaimer, the term of this patent is extended or adjusted under 35 U.S.C. 154(b) by 484 days.

(21) Appl. No.: 18/115,064

(22) Filed: Feb. 28, 2023

(65) Prior Publication Data

US 2023/0227684 A1 Jul. 20, 2023

Related U.S. Application Data

(63) Continuation of application No. PCT/JP2021/031854, filed on Aug. 31, 2021.

(30) Foreign Application Priority Data

Sep. 3, 2020 (JP) ................................. 2020-148434
Dec. 21, 2020 (JP) ................................. 2020-211048
Feb. 15, 2021 (JP) ................................. 2021-021811

(51) Int. Cl.
C09D 127/18 (2006.01)
C09D 7/45 (2018.01)
C09D 7/65 (2018.01)

(52) U.S. Cl.
CPC ............. C09D 127/18 (2013.01); C09D 7/45 (2018.01); C09D 7/65 (2018.01)

(58) Field of Classification Search
None
See application file for complete search history.

(56) References Cited

U.S. PATENT DOCUMENTS

2004/0171726 A1* 9/2004 Joseph D'Haenens ......................
C09D 127/18
524/805
2005/0239678 A1 10/2005 Nakanishi et al.
2020/0056031 A1* 2/2020 Kobayashi .............. C08L 27/18

FOREIGN PATENT DOCUMENTS

| | | |
|---|---|---|
| JP | 2005336266 A | 12/2005 |
| JP | 2006176489 A | 7/2006 |
| JP | 2006516673 A | 7/2006 |
| JP | 2009161616 A | 7/2009 |
| JP | 2012082437 A | 4/2012 |
| JP | 2019194314 A | 11/2019 |
| JP | 2020037661 A | 3/2020 |
| WO | WO-2014010968 A1 | 1/2014 |
| WO | WO-2018016644 A1 | 1/2018 |
| WO | WO-2018199034 A1 | 11/2018 |
| WO | WO-2022097678 A1 | 5/2022 |

OTHER PUBLICATIONS

International Search Report issued Nov. 2, 2021 in PCT/JP2021/031854 (with English translation), 4 pages.

* cited by examiner

*Primary Examiner* — Robert T Butcher
(74) *Attorney, Agent, or Firm* — Element IP, PLC

(57) ABSTRACT

To provide a powder dispersion comprising a tetrafluoroethylene polymer, a particular polyoxyalkylene-modified polydimethylsiloxane and a liquid dispersion medium, and a composite having a baked product having physical properties intrinsic to the tetrafluoroethylene polymer. [Solution] The powder dispersion of the present invention comprises a powder of a tetrafluorethylene polymer, a liquid dispersion medium and a polyoxyalkylene-modified polydimethylsiloxane having a weight average molecular weight of at most 3,000 and an HLB value of from 1 to 18 calculated by Griffin's equation The composite of the present invention is produced by applying the powder dispersion of the present invention to the surface of a substrate and heating the powder dispersion.

17 Claims, No Drawings

POWDER DISPERSION AND METHOD FOR PRODUCING COMPOSITE

TECHNICAL FIELD

The present invention relates to a powder dispersion and a method for producing a composite.

BACKGROUND ART

Printed wiring boards used for transmission of high frequency signals have to have good transmission characteristics. Tetrafluoroethylene polymers have been attracting attention for their low dielectric constants and low dielectric dissipation factors as a material for insulating layers to provide printed wiring boards with good transmission characteristics. Insulating layers containing such a polymer are conventionally formed from a powder dispersion containing a tetrafluoroethylene polymer powder and a liquid dispersion medium.

Tetrafluoroethylene polymers generally have a low surface tension and, hence, powders of them are hardly dispersible. Patent Documents 1, 2 and 3 propose incorporation of certain surfactants to provide stable powder dispersions.

PRIOR ART DOCUMENTS

Patent Documents

Patent Document 1: JP-A-2009-161616
Patent Document 2: JP-A-2012-082437
Patent Document 3: WO2014/010968

DISCLOSURE OF INVENTION

Technical Problem

However, powder dispersions disclosed in these documents are foamy and hence are poor in handleability when it is prepared, blended with other ingredients such as a resin varnish, or applied as coatings. In addition, these dispersions require control of physical properties such as pH, viscosity and uniformity during long storage.

Preparation of stable powder dispersions excellent in these physical properties tends to require other additives, which make their preparation cumbersome. This problem tends to be remarkable when a silicone surfactant or a fibrillated polytetrafluoroethylene powder is used.

Besides, when such a powder dispersion is baked, the baked product tend to suffer damage to its physical properties such as electrical properties and surface smoothness from remaining surfactants or their decomposition.

The object of the present invention is to provide a powder dispersion with good dispersion stability and handleability and a long storage life. From such a powder dispersion, a composite comprising a baked product of a tetrafluoroethylene polymer having good physical properties intrinsic to a tetrafluoroethylene polymer can be produced easily.

Solution to Problem

The present invention provides the following aspects.

[1] A powder dispersion comprising a powder of a tetrafluoroethylene polymer, a liquid dispersion medium and a polyoxyalkylene-modified polydimethylsiloxane having a weight average molecular weight of at most 3,000 and an HLB value of from 1 to 18 calculated by Griffin's equation.

[2] The powder dispersion according to [1], wherein the polyoxyalkylene-modified polydimethylsiloxane has a static surface tension of at most 28 mN/m.

[3] The powder dispersion according to [1] or [2], wherein the polyoxyalkylene-modified polydimethylsiloxane has a dynamic surface tension of at most 40 mNlm.

[4] The powder dispersion according to any one of [1] to [3], wherein the polyoxyalkylene-modified polydimethylsiloxane has an HLB value of from 10 to 16.

[5] The powder dispersion according to any one of [1] to [4], wherein the variance of the molecular weight of the polyoxyalkylene-modified polydimethylsiloxane is less than 2.0.

[6] The powder dispersion according to any one of [1] to [5], wherein the polyoxyalkylene-modified polydimethylsiloxane has a degree of polymerization of from 2 to 100 for oxyalkylene groups and a degree of polymerization of from 2 to 100 for dimethylsiloxane.

[7] The powder dispersion according to any one of [1] to [6], wherein the polyoxyalkylene-modified polydimethylsiloxane comprises dimethylsiloxane units in the main chain and oxyalkylene groups in the side chains

[8] The powder dispersion according to any one of [1] to [6], wherein the polyoxyalkylene-modified polydimethylsiloxane comprises dimethylsiloxane units in the main chain and oxyalkylene groups at the ends of the main chain.

[9] The powder dispersion according to any one of [1] to [8], wherein the tetrafluoroethylene polymer comprises from 1 to 5 mol % of units based on perfluoro(alkyl vinyl ether) relative to all the units in it and has a melting temperature of from 260 to 320° C.

[10] The powder dispersion according to any one of [1] to [9], which comprises a first powder of a polytetrafluoroethylene and a second powder of a tetrafluoroethylene polymer comprising from 1 to 5 mol % of units based on perfluoro(alkyl vinyl ether) relative to all the units in it and having a melting temperature of from 260 to 320° C., wherein the ratio of the second powder to the sum of the first powder and the second powder is at most 25 mass %.

[11] The powder dispersion according to any one of [1] to [10], which further comprises at least one nonionic surfactant selected from the group consisting of ester surfactants, ether surfactants, ester ether surfactants, alkanolamide surfactants, alkylglycosides and higher alcohols.

[12] The powder dispersion according to any one of [1] to [11], wherein the liquid dispersion medium comprises water.

[13] The powder dispersion according to [12], which has a pH of from 6 to 12.

[14] A powder dispersion comprising a powder of a tetrafluoroethylene polymer, a polyoxyalkylene-modified polydimethylsiloxane comprising dimethylsiloxane units in the main chain and oxyalkylene groups in the side chains, or a polyoxyalkylene-modified polydimethylsiloxane comprising dimethylsiloxane units in the main chain and oxyalkylene groups at the ends of the main chain, and a liquid dispersion medium comprising at least water, wherein the powder dispersion has a viscosity of less than 400 m Pas.

[15] A method for producing a composite comprising a substrate and a baked product, which comprises applying the powder dispersion as defined in any one of [1] to [14]

to the surface of a substrate as a coating, and heating the coating to produce a baked product of the tetrafluoroethylene polymer.

ADVANTAGEOUS EFFECTS OF INVENTION

According to the present invention, a powder dispersion with good dispersion stability and handleability and a long storage life can be provided. According to the present invention, a composite having physical properties such as electrical properties intrinsic to a tetrafluoroethylene polymer and a smooth surface.

DESCRIPTION OF EMBODIMENTS

The terms used herein have the following meanings. "Average particle diameter (D50)" is a volume based cumulative 50% diameter of a sample such as a powder or a filler obtained by measuring a particle size distribution by the laser diffraction/scattering method as a diameter at which the cumulative volume reaches 50% of the total particle volume on the cumulative curve obtained from the particle size distribution.

"Melting temperature" is the temperature at the tip of the melting peak in the DSC (differential scanning calorimetry) chart of a polymer.

"Glass transition temperature (Tg)" is measured by dynamic mechanical analysis (DMA) of a polymer.

The "viscosity of a powder dispersion" is a viscosity measured with a B type viscometer at 25° C. at a rotation speed of 60 rpm. Triplicate measurements are averaged.

The "thixotropic ratio of a powder dispersion" is calculated by dividing the viscosity measured at 30 rpm by the viscosity measured at 60 rpm. Triplicate measurements are averaged for each viscosity.

The "specific surface of a powder" is measured with NOVA4200e (manufactured by Quantachrome Instruments) by the (constant volume) gas adsorption method based on the multi-point BET analysis.

The "weight average molecular weight of a polyoxyalkylene-modified polydimethylsiloxane" is a polystyrene equivalent weight average molecular weight measured by gel permeation chromatography (GPC).

The "HLB value of polyoxyalkylene-modified polydimethylsiloxane" is calculated by Griffin's equation as 20 times the ratio of the molecular weight of the polyoxyalkylene segments in the molecule to the molecular weight of the organopolysiloxane itself.

"Static surface tension" is measured by the Wilhelmy method with an automatic surface tensiometer Model CBVP-Z (manufactured by Kyowa Interface Science Co., Ltd.) using a 0.1 mass % aqueous solution of a polyoxyalkylene-modified polydimethylsiloxane.

"Dynamic surface tension" is measured by the maximum bubble pressure method at 25° C. at a bubble formation frequency of 6 Hz using a 0.1 mass % aqueous solution of a polyoxyalkylene-modified polydimethylsiloxane with the sensor of a dynamic surface tensiometer SITA t60, manufactured by EKO INSTRUMENTS CO., LTD. in the aqueous solution.

A "unit" in a polymer mean an atomic group derived from 1 molecule of a monomer by polymerization. A unit may be an atomic group directly formed by a polymerization reaction, or may be an atomic group formed by polymerization and subsequent partial structural modification. Hereinafter, a unit based on monomer a is referred to simply as a "monomer a unit".

The powder dispersion (hereinafter referred to as "the present dispersion") comprises a powder (hereinafter referred to as an "F powder") of a tetrafluoroethylene polymer (hereinafter referred to as an "F polymer"), a liquid dispersion medium and a polyoxyalkylene-modified polydimethylsiloxane having a weight average molecular weight of at most 3,000 and an HLB value of from 1 to 18 calculated by Griffin's equation and a dispersion containing particles of a F powder dispersed therein. The polyoxyalkylene-modified polydimethylsiloxane is a nonionic compound.

The present dispersion has good dispersion stability and handleability and a long storage life. The baked product of the present dispersion has good physical properties such as electrical properties intrinsic to the tetrafluoroethylene polymer and has a smooth surface.

The reason is considered as follows, though it is not entirely clear. When incorporated in a dispersion of an F powder, nonionic surfactants interact with the surface of the F powder to keep the F powder stably dispersed, while they gather at the surface of the dispersion and lower the surface tension of the dispersion, thereby making the dispersion foamy and difficult to handle and blend with other ingredients.

Especially, in the case of silicone surfactants, the above-mentioned tendency is remarkable because their molecular structure hinders them from interacting with the F powder sufficiently. For example, they need to be incorporated in such a large amount to stably disperse the F powder that the dispersion inevitably becomes difficult to handle and blend.

In contract, the polyoxyalkylene-modified polydimethylsiloxane to be used in the present dispersion is a nonionic compound having a low weight average molecular weight and an HLB value within the particular range and is also a silicone surfactant with well-balanced hydrophobicity and hydrophilicity.

The polyoxyalkylene-modified polydimethylsiloxane is a polymer having a short polymer chain which can easily surround the surface of F powder particles and hence is considered to interact with the F powder readily. Namely, it is considered that in the present dispersion, the polyoxyalkylene-modified polydimethylsiloxane is preferentially adsorbed onto the F powder in large amounts to stabilize the dispersion without damage to the physical properties of the dispersion.

The polyoxyalkylene-modified polydimethylsiloxane having a low weight average molecular weight cannot resist thermal decomposition and hence easily decomposes upon heating when a baked product is produced from the present dispersion. Therefore, the baked product tends to retain the physical properties intrinsic to the F polymer.

The F polymer in the present invention is a polymer comprising unis (hereinafter referred to as "TFE units") based on tetrafluoroethylene (hereinafter referred to as "TFE").

The F polymer may be or may not be heat fusible.

When the F polymer is heat fusible, its melting temperature is preferably at least 180° C., more preferably from 200 to 325° C., further preferably from 260 to 320° C.

The melt viscosity of the F polymer at 380° C. is preferably from $1 \times 10^2$ to $1 \times 10^6$ Pa·s.

The glass transition point of the F polymer is preferably from 30 to 150° C., more preferably from 75 to 125° C.

The fluorine content of the F polymer is preferably at 70 mass %, more preferably from 72 to 76 mass %.

The F polymer may, for example, be a polytetrafluoroethylene (hereinafter referred to as "PTFE"), a polymer (hereinafter referred to as "ETFE") comprising TFE units and units based on ethylene, a polymer comprising TFE units and units based on propylene, a polymer (hereinafter referred to as "PAVE") comprising TFE units, units (hereinafter referred to as "PAVE units") based on a perfluoro (alkyl vinyl ether) (hereinafter referred to as "PFA"), a polymer (hereinafter referred to as "FEP") comprising TFE units and units based on hexafluoropropylene (hereinafter referred to as "HFP"), a polymer comprising TFE units and units based on a fluoroalkylethylene, or a polymer comprising TFE units and units based on chlorotrifluoroethylene, and is preferably a PFA or a FEP, more preferably a PFA. The polymer may comprise units based on another comonomer.

The PTFE may be a low molecular weight PTFE or a modified PTFE. The low molecular weight PTFE and the a modified PTFE cover copolymers comprising copolymers of TFE and a trace amount of a comonomer (such as HFP, PAVE or FAE).

The PAVE is preferably $CF_2=CFOCF_3$, $CF_2=CFOCF_2CF_3$ or $CF_2=CFOCF_2CF_2CF_3$ (hereinafter referred to as "PPVE"), more preferably PPVE.

The F polymer preferably has an oxygen-containing polar group so that the present dispersion tends to be stable and make a baked product such as a polymer layer with good physical properties such as electrical properties, surface smoothness and adhesiveness.

The oxygen-containing polar group may be located in monomer units in the F polymer or in the terminal groups at the ends of the main chain of the F polymer. In the latter case, the F polymer may have the oxygen-containing polar group as the terminal group derived from a polymerization initiator or a chain transfer agent.

The oxygen-containing polar group is preferably a hydroxy-containing group or a carbonyl-containing group, more preferably a carbonyl-containing group.

The hydroxy-containing group is preferably a group containing an alcoholic hydroxy group, more preferably —$CF_2CH_2OH$ or $C(CF_3)_2OH$.

The carbonyl-containing group is a group containing a carbonyl group (>C(O)), and is preferably a carboxyl group, an alkoxycarbonyl group, an amido group, an isocyanato group, a carbamate group (—OC(O)NH$_2$), an acid anhydride residue (—C(O)OC(O)—), an imide residue (such as —C(O)NHC(O)—) or a carbonate group (—OC(O)O—), more preferably an acid anhydride residue.

The number of carbonyl-containing groups, if any, in the F polymer is preferably from 10 to 5,000, more preferably from 50 to 4,000, further preferably from 100 to 2,000 per $1\times10^6$ carbon atoms in the main chain so that the present dispersion tends to be stable and have a long storage life. The number of carbonyl-containing groups in the F polymer can be calculated from the polymer composition or can be measured as disclosed in WO 2020/145133.

The F polymer is preferably a tetrafluoroethylene polymer comprising from 1 to 5 mol % of PAVE units relative to all the units and having a melting temperature of from 260 to 320° C., more preferably a polymer (1) comprising from 1.5 to 3 mol % of PAVE units relative to all the units and having an oxygen-containing polar group or a polymer (2) comprising from 2 to 5 mol % of PAVE units relative to all the units and having no oxygen-containing polar groups. Use of these polymers tends to lead to production of a baked product such as a polymer layer with better properties as they form microspherulites in the baked product.

The polymer (1) is preferably a polymer comprising TFE unis, PAVE units and units based on a monomer having a hydroxy- or carbonyl-containing group, or a polymer comprising TFE units and PAVE units which has a hydroxy- or carbonyl-containing group in the terminal groups at the ends of the main chain, and the former is more preferred. The polymer (1) preferably comprises from 94 to 98.49 mol % of TFE units, from 1.5 to 3 mol % of PAVE units and from 0.01 to 3 mol % of units based on the above-mentioned monomer, relative to all the units.

The above-mentioned monomer is preferably itaconic anhydride, citraconic anhydride or 5-norbornene-2,3-dicarboxylic anhydride (also known as himic anhydride; hereinafter referred to as "NAH"), Specific examples of the polymer (1) are those disclosed in WO2018/16644.

The polymer (2) preferably consists of from 95 to 98 mol % of TFE units and from 2 to 5 mol % of PAVE units, relative to all the monomer units.

The content of PAVE units in the polymer (2) is preferably at least 2.1 mol %, more preferably at least 2.2 mol %, relative to all the monomer units.

Having no oxygen-containing polar groups means that the polymer (2) has less than 500 oxygen-containing polar groups per $1\times10^6$ carbon atoms in the main chain.

The number of oxygen-containing polar groups is preferably at most 100, more preferably smaller than 50. The lower limit of the number of oxygen-containing polar groups is usually 0.

The polymer (2) may be produced by using a polymerization initiator or a chain transfer agent which does not form an oxygen-containing polar group at the ends of the polymer chain, or by fluorinating an F polymer having an oxygen-containing polar group, for example, with fluorine gas (as disclosed in JP-A-2019-194314).

The F powder in the present invention is a powder comprising the F polymer, and the content of the F polymer in the F powder is preferably at least 80 mass %, more preferably 100 mass %.

The F powder may be a single species or may be a combination of two or more species. In the case of a combination of two or more species, it is preferred to use a combination of a first powder of a PTFE and a second powder of an F powder comprising from 1 to 5 mol % of PAVE units relative to all the units and having a melting temperature of from 260 to 320° C. In such a case, the ratio of the second powder to the sum of the first powder and the second powder is preferably at most 25 mass %, more preferably at most 15 mass %. The ratio is preferably at least 0.1 mass %, more preferably at least 1 mass %.

In such a case, the present dispersion is not only stable and has good handleability and a long storage life, but also tends to give an adhesive baked product having good physical properties intrinsic to PTFE.

In such a case, it is preferred that the D50 of the first powder is from 0.1 to 1 μm, and the D50 of the second powder is from 0.1 to 1 μm, or that the D50 of the first powder is from 0.1 to 1 μm, and the D50 of the second powder is from 1 to 4 μm. The second powder is a powder of the polymer (1) or a powder of the polymer (2), preferably a powder of the polymer (1).

The F powder may comprise an additional polymer which is not an F polymer, or an inorganic substance.

The additional polymer may be an aromatic polyester, a polyamideimide, a polyimide, a polyphenylene ether, a polyphenylene oxide or a maleimide.

The inorganic substance may be silicon oxide (silica), a medal oxide (such as beryllium oxide, cerium oxide, alumina, soda alumina, magnesium oxide, zinc oxide or titanium oxide), boron nitride or sodium metasilicate (steatite).

The F powder comprising an additional polymer which is not an F polymer or an inorganic substance preferably has a core-shell structure having a core of the F polymer and a shell of the additional polymer which is not an F polymer or the inorganic substance, or a core-shell structure having a shell of the F polymer and a core of the additional polymer which is not an F polymer. Such an F powder is obtainable by coalescing a powder of the F polymer and a powder of the additional polymer which is not an F polymer or a powder of the inorganic substance by collision, aggregation or the like.

The D50 of the F powder is preferably at most 100 μm, more preferably at most 50 μm, further preferably at most 8 μm. The D50 of the F powder is preferably at least 0.1 μm, more preferably at least 0.3 μm, further preferably at least 1 μm. Especially, when the F polymer is a polymer (1), the D50 of the F powder in the present dispersion is preferably from 1 to 8 μm.

When the F powder comprises a first powder and a second powder, the D50 of the F powder is preferably from 0.1 to 5 μm, more preferably from 0.1 to 3 μm.

The specific surface area of the F powder is from 1 to 8 $m^2/g$, more preferably from 1 to 3 $m^2/g$. The present dispersion tends to have good dispersion stability and handleability and a long storage life, because of the previously mentioned mechanism, even when the F powder is such a fine powder having a small D50.

The polyoxyalkylene-modified polydimethylsiloxane in the present invention is an organopolysiloxane having a polyoxyalkylene hydrophilic group and a polydimethylsiloxane hydrophobic group, and is preferably a linear polymer.

The weight average molecular weight of the polyoxyalkylene-modified polydimethylsiloxane is at most 3,000, preferably at most 2,500, more preferably at most 2,000. The weight average molecular weight is preferably at least 100, more preferably at least 500. In such a case, the present dispersion tends to have good dispersion stability and handleability and a long storage life, because of the previously mentioned mechanism. Because such a polyoxyalkylene-modified polydimethylsiloxane cannot resist thermal decomposition, a baked product with better physical properties is likely to be produced.

The number average molecular weight of the polyoxyalkylene-modified polydimethylsiloxane is preferably at most 3,000, more preferably at most 1,500. The number average molecular weight is preferably at least 100, more preferably at least 500.

The variance of the molecular weight of the polyoxyalkylene-modified polydimethylsiloxane is preferably less than 2.0, more preferably at most 1.8. The lower limit of the variance of the molecular weight is preferably larger than 1.0.

The HLB value of the polyoxyalkylene-modified polydimethylsiloxane is from 1 to 18. It is preferably at least 3, more preferably at least 6, further preferably at least 10, particularly preferably at least 12. The HLB value is preferably at most 16, more preferably at most 15.

The static surface tension of the polyoxyalkylene-modified polydimethylsiloxane is preferably at most 28 mN/m, more preferably at most 26 mN/m. The static surface tension is preferably at least 15 mN/m, more preferably at least 20 mN/m.

The dynamic static surface tension of the polyoxyalkylene-modified polydimethylsiloxane is preferably at most 40 mN/m, more preferably at most 35 mN/m. The dynamic static surface tension is preferably at least 20 mN/m.

The polyoxyalkylene-modified polydimethylsiloxane may have dimethylpolysiloxane units ($—(CH_3)_2SiO_{2/2}—$) in the main chain or in the side chains or both in the main chain and in the side chains.

The polyoxyalkylene-modified polydimethylsiloxane is preferably a polyoxyalkylene-modified polydimethylsiloxane comprising dimethylsiloxane units in the main chain and oxyalkylene groups in the side chains, or a polyoxyalkylene-modified polydimethylsiloxane comprising dimethylsiloxane units in the main chain and oxyalkylene groups at the ends of the main chain.

The polyoxyalkylene-modified polydimethylsiloxane preferably comprises diorganosiloxane units represented by the formula $—(R^1)(R^2)SiO_{2/2}—$:

wherein $R^1$ is an alkyl group, preferably a methyl group, $R^2$ is a group having a polyoxyalkylene group, preferably a group represented by the formula $—X^2—O—(Y^2)_n—Z^2$ (wherein $X^2$ is an alkylene group, $Y^2$ is a polyoxyalkylene group, $Z^2$ is a hydrogen atom, an alkyl group or an acyl group, and n is an integer of from 2 to 100).

$X^2$ may, for example, be an ethylene group, a propylene group or a butylene group.

$Y^2$ may, for example, be an oxyethylene group or an oxypropylene group.

The alkyl group or the acyl group as $Z^2$ may, for example, be a methyl group or an acetyl group.

The polyoxyalkylene-modified polydimethylsiloxane may comprises only one species of oxyalylene groups or two or more species of oxyalylene groups which may be connected randomly or in blocks.

The degree of polymerization for oxyalkylene groups (the number of oxyalkylene repeating units) in the polyoxyalkylene-modified polydimethylsiloxane is preferably at least 2. It is preferably at most 100, more preferably at most 50, further preferably at most 20.

The degree of polymerization for dimethylsiloxane (the number of dimethylsiloxane repeating units) in the polyoxyalkylene-modified polydimethylsiloxane is preferably at least 2. It is preferably at most 100, more preferably at most 50, further preferably at most 25. In such a case, the present dispersion tends to have good dispersion stability and handleability and a long storage life.

Specific examples of the polyoxyalkylene-modified polydimethylsiloxane include "BYK-347", "BYK-349", "BYK-378", "BYK-3450", "BYK-3451", "BYK-3455", "BYK-3456" (manufactured by BYK Japan KK), "KF-6011" and "KF-6043".

The liquid dispersion medium in the present invention is preferably a polar compound which is in a liquid state at 25° C. at atmospheric pressure, more preferably at least one species selected from water, amides, ketones and esters.

The boiling point of the liquid dispersion medium is preferably within the range of from 50 to 240° C.

The liquid dispersion medium may be a single species or may be a combination of two or more species.

When such a liquid dispersion medium is used, the present dispersion tends to have good dispersion stability and handleability and a long storage life.

Specific examples of the liquid dispersion medium include water, N,N-dimethylformamide, N,N-dimethylacetamide, 3-methoxy-N,N-dimethylpropanamide, 3-butoxy-N, N-dimethylpropanamide, N-methyl-2-pyrrolidone, γ-butyrolactone, cyclohexanone, cyclopentanone, butyl acetate, methyl isopropyl ketone and methyl ethyl ketone.

The liquid dispersion medium may comprise an additional solvent.

As the additional solvent, aliphatic or aromatic hydrocarbons such as toluene; glycols; glycol ethers such as glycol monoalkyl ether and glycol monoaryl ether; glycol acetates such as glycol monoalkyl ether acetate and glycol monoaryl ether acetate may be mentioned.

The liquid dispersion medium preferably comprises water. The content of water in the liquid dispersion medium is preferably at least 80 mass %, more preferably 100 mass %.

When the liquid dispersion medium comprises water, the pH of the present dispersion is preferably from 6 to 12, more preferably from 7 to 11, so that the present dispersion tends to have a long storage life.

The present dispersion may comprise ammonia or an amine for pH adjustment.

Specific examples of the amine include alkanolamines such as ethanolamine, secondary amines such as dimethylamine and diethylamine, tertiary amines such as triethylamine and N-methylmorpholine, and quaternary ammonium hydroxides such as tetramethylammonium hydroxide.

The content of the F polymer in the present dispersion is preferably at least 5 mass %, more preferably at least 10 mass %, further preferably at least 25 mass %. The content of the F polymer is preferably at most 70 mass %, more preferably at most 50 mass %. In such a case, the present dispersion tends to have good dispersion stability and handleability and a long storage life and produce a baked product having any thickness.

The content of the polyoxyalkylene-modified polydimethylsiloxane in the present composition is preferably at most 30 mass %, more preferably at most 15 mass %. The content of the polyoxyalkylene-modified polydimethylsiloxane is preferably at least 0.1 mass %, more preferably at least 1 mass %, In such as case, the present dispersion tends to have good dispersion stability and handleability and a long storage life and produce a baked product with good physical properties such as electrical properties and a smooth surface.

The content of the liquid dispersion medium in the present invention is preferably from 30 to 90 mass %, more preferably from 50 to 80 mass %.

The viscosity of the present dispersion is preferably at least 5 mPa·s, more preferably at least 10 mPas. The viscosity of the present dispersion is preferably at most 2,000 mPa·s, more preferably at most 1,000 mPa·s, further preferably less than 400 mPa·s, particularly preferably less than 300 mPa·s. In such a case, the present dispersion is easy to apply and tends to produce a baked product (such as a polymer layer) having any thickness. When the present dispersion falls within the above-mentioned viscosity range, it tends to produce a baked product having physical properties intrinsic to the F polymer.

The thixotropic ratio of the present dispersion is preferably at least 1.0. The thixotropic ratio of the present dispersion is preferably at most 3.0, more preferably at most 2.0. In such a case, the present invention is easy to apply and homogeneous and tends to produce a denser baked product (such as a polymer layer).

The present dispersion may comprise an additional resin (polymer) which is not an F polymer. The present dispersion tends to have good dispersion stability and handleability and a long storage life even when it comprises an additional resin.

The additional resin may be a thermosetting resin or a thermoplastic resin. The additional resin may, for example, be an epoxy resin, a maleimide resin, a urethan resin, an elastomer, a polyimide, a polyamic acid, a polyimide-imide, a polyphenylene ether, a polyphenylene oxide, a liquid crystal polyester or a fluoropolymer other than F polymers.

The additional polymer is preferably an aromatic polymer. When the present dispersion comprises an aromatic polymer, the present dispersion tends to produce a baked product having good adhesiveness, low linear expansivity and good UV absorption.

The aromatic polymer is preferably an aromatic polyimide, an aromatic polyamide-imide, an aromatic maleimide, an aromatic elastomer such as a styrene elastomer or an aromatic polyamic acid, more preferably an aromatic polyimide, an aromatic polyamide-imide, a precursor of an aromatic polyamide-imide, an aromatic maleimide, a polyphenylene ether or an romantic elastomer such as a styrene elastomer, further preferably an aromatic polyimide or an aromatic polyamic acid.

The aromatic polyimide may be thermoplastic or thermosetting. A thermosetting polyimide means a polyimide which is a fully imidized compound and does not undergo further imidization.

Specific examples of the aromatic polyimide include "Neopulim (registered trademark)" series (manufactured by MITSUBISHI GAS CHEMICAL COMPANY, INC.), "SPIXAREA (registered trademark)" series (manufactured by SOMAR Corp.), "Q-PILON (registered trademark)" series (manufactured by PI R & D CO., LTD), "WINGO" series (manufactured by WINGO TECHNOLOGY Co., Ltd.), "Tomide (registered trademark)" series (manufactured by T&K TOKA Corporation), "KPI-MX" series (manufactured by Kawamura Sngyo Co., Ltd.) and "UPIA (registered trademark)" (manufactured by UBE Corporation).

Specific examples of the aromatic polyamide-imide and the precursor of an aromatic polyamide-imide include "HPC-100" and "HPC-2100D" (manufactured by Showa Denko Materials Co., Ltd.).

As the styrene elastomer, a styrene-butadiene copolymer, a hydrogenated styrene-butadiene copolymer, a hydrogenated styrene-isoprene copolymer, a styrene-butadiene-styrene block copolymer, a styrene-isoprene-styrene block copolymer, a hydrogenated styrene-butadiene-styrene block copolymer, a hydrogenated styrene-isoprene-styrene block copolymer or the like may be mentioned.

The present dispersion may further comprise an inorganic filler. In such as case, the present dispersion tends to produce a baked product with good electrical properties and low linear expansivity.

The inorganic filler is preferably a nitride filler or an inorganic oxide filler, more preferably a boron nitride filler, a beryllia, or beryllium oxide, filler, a silica filler, a silicate filler such as a wollastonite filler or a talc filler or a metal oxide filler such as a cerium oxide filler, an aluminum oxide filler, a magnesium oxide filler, a zinc oxide filler or a titanium oxide filler, further preferably a silica filler.

The inorganic filler preferably has a surface at least partly treated with a silane coupling agent (such as 3-aminopropyltriethoxysilane, vinyltrimethoxysilane, 3-mercaptopropyltrimethoxysilane, 3-glycidoxypropylmethyldiethoxysilane, 3-methacryloxypropyltriethoxysilane or 3-isocyanatopropyltriethoxysilane).

The D50 of the inorganic filler is preferably at most 20 μm, more preferably at most 10 μm. The D50 is preferably at least 0.01 μm, more preferably at least 0.1 μm.

The inorganic filler may be in any shape and may be granular, acicular (filiform) or tabular. Specifically speaking, the inorganic filler may be spherical, flaky, laminar, foliate, amygdaloidal, columnar, cock's comb-like, equiaxial, leafy, micaceous, block-shaped, plane, wedge-shaped, rosulate, cancellous or prismatic.

The inorganic filler may be a single species or a combination of two or more species.

Preferred examples of the inorganic filler are a silica filler (such as "ADMAFINE (registered trademark)" series manufactured by Admatics), a zinc oxide filler having a surface treated with an ester such as propylene glycol dicaprate (such as "FINX (registered trademark)" series manufactured by SAKAI CHEMICAL INDUSTRY CO., LTD.), a spherical fused silica filler ("SFP (registered trademark)" series manufactured by Denka Company Limited), a titanium oxide filler having a coating of a polyhydric alcohol and an inorganic substance (such as "TIPAQUE (registered trademark)" series manufactured by ISHIHARA SANDY© KAISHA, LTD.), a rutile titanium oxide filler having a surface treated with an alkylsilane (such as "JMT(registered trademark)" series manufactured by TAYCA Co., Ltd.), a hollow silica filler (such as "E-SPHERES" series manufactured by TAIHEIYO CEMENT CORPORATION, "SiliNax" series manufactured by Nittetsu Mining Co., Ltd., and "Ecocosphere" series manufactured by Emerson & Coming, Inc.), a talc filler (such as "SG" series manufactured by Nippon Talc Co., Ltd.), a steatite filler (such as "BST" series manufactured by Nippon Talc Co., Ltd.), a boron nitride filler (such as "UHP" series manufactured by SHOWA DENKO K.K., and "Denka Boron Nitride" series ("GP" and "HGP" grades) manufactured by Denka Company Limited).

The present dispersion may comprise a thixotropic agent, a defoamer, a silane coupling agent, a dehydrating agent, a plasticizer, a weathering agent, an antioxidant, a heat stabilizer, a lubricant, an antistatic agent, a brightening agent, a colorant, an electrically conductive additive, a release agent, a viscosity modifier, a flame retardant and an organic filler, in addition to the above-mentioned ingredients. The present dispersion preferably comprises no fluorinated surfactants. The present dispersion tends to have good dispersion stability due to the above-mentioned mechanism, even without a fluorinated surfactant.

The content of an aromatic polymer, if any, in the present dispersion is preferably from 0.1 to 20 mass %, more preferably from 1 to 10 mass %. The content of an inorganic filler, if any, in the present dispersion is preferably from 1 to 50 mass %, more preferably from 5 to 40 mass %.

An preferred embodiment of the present dispersion further comprises at least one nonionic surfactant (hereinafter referred to as "an additional surfactant") selected from the group consisting of ester surfactants, ether surfactants, ester ether surfactants, alkanolamide surfactants, alkylglycosides and higher alcohols. In such a case, the present dispersion tends to show even better dispersion stability during long storage. The reason is considered to be that the dispersing action of a highly stable additional surfactant on the F powder relatively increases with time, although it is not entirely clear. Especially, when the liquid dispersion medium in the present dispersion is water, such an action tends to be enhanced.

The content of an additional surfactant, if any, in the present dispersion is preferably from 0.1 to 15 mass %, more preferably from 1 to 10 mass %. The ratio of the content of an additional surfactant to the polyoxyalkylene-modified polydimethylsiloxane in the present dispersion is preferably from 0.1 to 10.

The additional surfactant is preferably an ether surfactant or an ester ether surfactant, more preferably glycol monoalkyl ether, glycol monoaryl ether, glycol monoalkyl ether acetate or glycol monoaryl ether acetate, further preferably glycol monoalkyl ether.

The glycol monoalkyl ether is preferably polyoxyethylene glycol monoalkyl ether, preferably comprising from 1 to 10 oxyethylene units ($-OCH_2CH_2-$) and having a highly branched monoalkyl ether group.

Specific examples of additional surfactants include polyethylene glycol decyl ether, polyethylene glycol undecyl ether, polyethylene glycol dodecyl ether, polyethylene glycol tridecyl ether, polyethylene glycol tetradecyl ether, triethylene glycol monomethyl ether, polyethylene glycol trimethylnonyl ether, ethylene glycol mono-2-ethylhexyl ether, diethylene glycol monomethyl ether, diethylene glycol monoethyl ether, diethylene glycol monobutyl ether, dipropylene glycol monobutyl ether, triethylene glycol monomethyl ether, tripropylene glycol monobutyl ether, propylene glycol monophenyl ether, diethylene glycol monoethyl ether acetate and diethylene glycol monobutyl ether acetate.

Preferred examples of additional surfactants include "Tergitol" series (manufactured by Dow Chemical Company such as "Tergitol TMN-100X"), "Lutensol T08", "Lutensol XL70", "Lutensol XL80", "Lutensol XL90", "Lutensol XP80", "Lutensol M5" (manufactured by BASF SE), "Newcol 1305", "Newcol 1308FA", "Newcol 1310" (manufactured by NIPPON NYUKAZAI CO., LTD.), "LEOCOL TDN-90-80" and "LEOCOL SC-90" (manufactured by Lion Specialty Chemicals Co., Ltd.).

The present invention can also provide a powder dispersion comprising a powder of a tetrafluoroethylene polymer, a polyoxyalkylene-modified polydimethylsiloxane comprising dimethylsiloxane units in the main chain and oxyalkylene groups in the side chains, or a polyoxyalkylene-modified polydimethylsiloxane comprising dimethylsiloxane units in the main chain and oxyalkylene groups at the ends of the main chain, and a liquid dispersion medium comprising at least water, wherein the powder dispersion has a viscosity of less than 400 mPa·s (hereinafter referred to as "the second present dispersion").

The F powder and the polyoxyalkylene-modified polydimethylsiloxane in the powder dispersion and their preferred examples are the same as those in the present dispersion.

The liquid dispersion medium which comprises at least water in the powder dispersion may consist of water only, or may comprise water and an additional liquid dispersion medium. The additional liquid dispersion medium is the same as those mentioned above for the present dispersion.

Various features of the powder dispersion, including preferred embodiments, are the same as those of the present dispersion. Especially, the viscosity of the powder dispersion is preferably at least 5 mPa·s and less than 400 mPa·s, more preferably at least 10 mPa·s and less than 300 mPa·s.

The polyoxyalkylene-modified polydimethylsiloxane comprising dimethylsiloxane units in the main chain and oxyalkylene groups in the side chains, or the polyoxyalkylene-modified polydimethylsiloxane comprising dimethylsiloxane units in the main chain and oxyalkylene groups at the ends of the main chain preferably has a weight average molecular weight of at most 3,000, and an HLB value of from 1 to 18 calculated by Griffin's equation.

The more preferred ranges of the weight average molecular weight and the HLB value are the same as those previously mentioned.

The present dispersion or the second present dispersion can be produced by mixing the F powder, the polyoxyalkylene-modified polydimethylsiloxane, the liquid dispersion medium and, if necessary, an additional surfactant, preferably by mixing a liquid composition comprising the poly-oxyalkylene-modified polydimethylsiloxane, the liquid dispersion medium and, if necessary, an additional surfactant with the F powder.

When the present dispersion or the second present dispersion comprises two or more species of F powder, the present dispersion or the second present dispersion may be produced by mixing a mixture of the two or more species of F powder with a liquid composition comprising the poly-oxyalkylene-modified polydimethylsiloxane and the liquid dispersion medium, or by mixing a liquid composition comprising one species of F powder, the liquid dispersion medium, and, if necessary, an additional surfactant with a liquid composition comprising a different species of F powder and the liquid dispersion medium, and the latter method is preferred.

In the latter method, the liquid composition comprising a different species of F powder and the liquid dispersion medium may further comprise the polyoxyalkylene-modified polydimethylsiloxane or an additional surfactant.

A composite comprising a substrate and a baked product of the F polymer is obtained by applying the present dispersion to the surface of the substrate as a coating and heating the coating into the baked product. The composite may, for example, be a laminate (hereinafter referred to as "the present laminate") comprising a substrate and a polymer layer (hereinafter referred to as an "F layer") comprising the F polymer, a fiber sized with the F polymer, a prepreg comprising fibers sized with the F polymer and a matrix resin, or a fiber-reinforced composite material made from such a prepreg.

When the substrate is a sheet, the present laminate comprising an F layer on the surface of a substrate sheet is obtained by applying the present dispersion onto the surface of the substrate sheet to form a liquid film, removing the liquid dispersion medium from the liquid film by heating to form a dry film, and baking the F polymer by heating the dry film.

The substrate sheet may, for example, be a metal substrate such as a metal foil of copper, nickel, aluminum, titanium or an alloy thereof, a heat resistant resin film or a prepreg as a precursor of a fiber-reinforced resin substrate. The heat resistant resin film means a film comprising at least one heat resistant resin such as polyimide, polyarylate, polysulfone, polyarylsulfone, polyamide, polyetheramide, polyphenylene sulfide, polyaryl ether ketone, polyamide-imide, liquid crystal polyester, liquid crystal polyesteramide and an F polymer, and may be a monolayer film or a multilayer film. As the F polymer in a heat resistant resin film, a PTFE, a PFA and a FEP are preferred.

The present dispersion may be applied to the surface of a substrate sheet by any method such as coating, spraying and dipping, as long as the surface of the substrate is wetted with a static liquid film of the present dispersion, and coating is preferred.

The liquid film is dried by heating it at a temperature high enough to evaporate the liquid dispersion medium to form a dry film on the surface of the substrate sheet. The heating temperature is preferably not higher by 50° C. than the boiling point of the liquid dispersion medium, and more preferably not higher than the boiling point. Specifically speaking, the temperature during the drying is from 70 to 200° C. Removal of the liquid dispersion medium may be carried out in an air blow.

The drying does not require complete evaporation of the liquid dispersion medium, as long as a self-supporting film which can keep a certain shape is left behind.

The temperature during baking of the F polymer is preferably 380° C. or below.

The heating may be carried out at atmospheric pressure or at reduced pressure.

The heating may be carried out in an oxidative gas atmosphere of oxygen gas or the like, a reductive gas atmosphere of hydrogen gas or the like, or an inert atmosphere of helium gas, neon gas, argon gas, nitrogen gas or the like.

The heating time is preferably from 0.1 to 30 minutes, more preferably from 0.5 to 20 minutes.

The thickness of the F layer is preferably from 0.1 to 150 μm. Specifically speaking, when the substrate sheet is a metal foil, the thickness of the F layer is preferably from 1 to 30 μm. When the substrate sheet is a heat resistant resin film, the thickness of the F layer is preferably from 1 to 150 μm.

The peeling strength between the F layer and the substrate sheet is preferably at least 10 N/cm, more preferably at least 15 N/cm. The peeling strength is preferably at most 100 N/cm. The present dispersion enables easy production of the present laminate without damage to the physical properties of the F polymer in the F layer.

The present dispersion may be applied to either surface of the substrate sheet or to both surfaces of the substrate sheet. In the former case, the resulting present laminate comprises the substrate sheet and an F layer formed on either surface of the substrate sheet, and in the latter case, the resulting present laminate comprises the substrate sheet and an F layer formed on each surface of the substrate sheet. The present laminate in the latter case is more unlikely to warp and easy to handle when it is worked.

The present laminate having an F layer on each surface of the substrate sheet is preferably obtained by applying the present dispersion onto both surfaces of the substrate by dipping in the present dispersion and heating the substrate in a baking oven. Specifically speaking, it is obtained more preferably by dipping the substrate in the present dispersion and passing upward the substrate withdrawn from the present dispersion through the heated baking oven.

It is preferred to withdraw and pass the substrate upward vertically so that a flat F layer is formed. After the upward movement, the substrate may be pulled down vertically with or without further heating before taken up.

The coating amount of the present dispersion on the substrate can be controlled by passing the substrate wetted with the present dispersion between a pair of rolls.

An apparatus equipped with a dip coater and a baking oven is suited for production of the present laminate. The baking oven may be a vertical baking oven.

As such an apparatus, the glass cloth coating equipment manufactured by TABATA INDUSTRIAL MACHINERY CO., LTD. may be mentioned.

Embodiments of the present laminate include metal clad laminates comprising a metal foil and an F layer formed on at least one surface of the metal foil, and multilayer films comprising a polyimide film and an F layer on each surface of the polyimide film.

The present laminate is suitable as a material for a printed wiring board since it has an F layer having excellent electrical properties. Specifically speaking, it can be used suitably as a flexible metal clad laminate or a rigid metal clad laminate for manufacturing printed wiring boards, especially as a flexible metal clad laminate for manufacturing flexible printed wiring boards.

For manufacturing such a printed wiring board, a dielectric interlayer may be formed on a transmission line, a solder mask may be superposed on a transmission line, and a coverlay film may be superposed on a transmission line. These interlayer dielectric, solder mask and coverlay film may be formed from the present dispersion.

The present laminate is also useful as a carrier film for forming a ceramic green sheet, a carrier film for forming a secondary battery, a carrier film for forming a polymer electrolyte membrane or a carrier film for forming a catalyst layer of a polymer electrolyte fuel cell.

A laminate comprising an F layer and a substrate is useful as an antenna part, a printed wiring board, an aircraft part, an automobile part, sports gear, an item used in the food industry, a radiator, a paint, a cosmetic product or the like. It can be used as a new print wiring board base material which can prevent a printed circuit board populated with electronic components from heating up, in place of the conventional glass epoxy board.

Specific examples of its application include wire coverings for aircraft wires or the like, enamel wire coverings for motors of electric cars, separation membranes, electrode binders for lithium secondary batteries, fuel cells and the like, slide members, working tools, blades for wind mills, wind turbine generator systems, aircraft and the like, electrical insulating tape, oil-drilling insulating tape, materials for printed wiring boards, copy rolls, furniture, automobile dashboards, covers for electric appliances and the like, wear pads, wear strips, tube lamps, wafer guides, centrifugal pump wear parts, feed pumps for hydrocarbons, chemicals and water, boilers, hoppers, pipes, ovens, baking molds, chutes, dies, toilets, container coverings, power devices, transistors, thyristors, rectifiers, transformers, power MOS-FETs, CPUs, radiation fins and metal radiator plates. As separation membranes, microfiltration membranes, ultrafiltration membranes, reverse osmosis membranes, ion exchange membranes, dialysis membranes, gas separation membranes and the like may be mentioned. As slide members, load-bearing bearings, plain bearings, valves, bearings, bushings, bearing seals, thrust washers, wear rings, pistons, slide switches, toothed wheels, cam disks, belt conveyors, food belt conveyors and the like may be mentioned. As working tools, shovels, files, saws and the like may be mentioned.

More specific applications of it include housings for personal computers and displays, electronic device materials, automobile interiors and exteriors, sealing materials for processing machines for heating under low-oxygen conditions and vacuum ovens and plasma treatment machines and radiators in processing units such as sputtering apparatuses and various dry etching apparatuses.

The present dispersion may be used for forming insulating layers in printed wiring boards, thermal interface materials and powder module substrates, for forming thermal conductive heat-resistant coverings on coils used in power units such as motors by dip coating followed by drying, for bonding together ceramic or metallic parts in automobile engines, for making heat exchangers or fins or tubes in them corrosion resistant, and for coating the inside or outside of glass containers. Especially, it is suitably applied as high-impact coatings. Such glass containers include vials, injection syringes, syringes equipped with a needle, cartridge syringes and ampoules.

The present dispersion may be used in electrochemical devices equipped with electrodes such as secondary batteries like lithium ion batteries, primary batteries like lithium batteries, radical batteries, solar cells, especially dye-sensitized solar cells, fuel cells, capacitors like lithium ion capacitors, hybrid capacitors and electric double layer capacitors, condensers like aluminum electrolytic condensers and tantalum electrolytic condensers, electrochromic devices, electrochemical switching devices and various electrochemical sensors, as an electrode binder or as a coating for the separator, the anode or the cathode. The liquid dispersion medium in the present dispersion, when used as a coating, is preferably water.

The F powder itself may be applied as a coating. In such a case, as the coating, the F powder may be applied alone or applied together with other ingredients (such as an additional resin and an inorganic filler which may be present in the present dispersion) after mixed with them. In this case, the polymer (1) as the F polymer preferably has a D50 of from 1 to 8 μm or from 10 to 40 μm.

When the present dispersion comprising an electrically conductive filler, it can be used in applications that require electrical conductivity, for example, in the area of printed electronics. Specific applications include printed wiring boards, sensor electrodes, displays, RFID (radio frequency identification), photovoltaic power generation, lighting, disposable electronic devices, automobile heaters, electromagnetic interference (EMI), and manufacture of electrical elements in membrane switches and the like.

A baked product obtained from the present dispersion comprising an electrically conductive filler can be used as an adhesive in semiconductor devices, high density printed wiring boards, module components and the like for adhering electronic components such as IC ships, resistors and condensers to the substrate, adhering a radiation plate to the circuit board, and adhering LED chips to the substrate. The baked product can be used as an electrically conductive binder to connect electronic components to circuits (in place of soldering) when these electronic components are mounted on the substrate. It can also be used as an adhesive to bond together ceramic parts or metallic parts in automobile engines. The baked product also has applications mentioned in paragraph [0149] of WO2016/017801.

When the substrate is fibers, sized fibers having a surface coating of the F polymer can be obtained by applying the present dispersion to the surface of the fibers and evaporating the liquid dispersion medium.

The surface coating of the F polymer is preferably a baked product of the F polymer. Sized fibers having a surface coating of a baked product of the F polymer can be obtained by applying the present dispersion to fibers, evaporating the liquid dispersion medium and further baking the F polymer by heating.

The heating step for evaporation and the liquid dispersion medium and baking of the F polymer may be carried out as described previously for formation of the F layer.

The fibers may be glass fibers made of E glass, D glass, L glass, S glass, T glass, Q glass, UN glass, NE glass, spherical glass or the like; organic fibers such as aramid fibers, polyolefin fibers, modified polyphenylene ether fibers, vinylon fibers, rayon fibers, polyester fibers and natural fibers; boron fibers, carbon fibers or metal fibers, and are preferably carbon fibers.

As carbon fibers, those derived from a petroleum pitch, rayon or polyacrylonitrile (PAN), single-wall carbon nanotubes, multi-wall carbon nanotubes or carbon nanofibers may be mentioned, and carbon fibers derived from polyacrylonitrile (PAN) are preferred.

The fibers may be in any shape such as chopped strands, a surfacing mat or a roving, or a mat, woven cloth or no-woven cloth thereof. There are no particular restrictions on the length or the cross-sectional shape of the fibers.

Sized fibers may be used in the form of a fiber bundle or a fiber-reinforced sheet material. Sized fibers may be used in the form of continuous fibers or discontinuous fibers.

From fibers sized with the present dispersion, a prepreg or a fiber-reinforced composite material with good mechanical properties can be obtained easily as a matrix resin adheres well to them and penetrates well into a fiber bundle.

A prepreg can be produced by dipping sized fibers into a matrix resin or a matrix resin composition and drying to touch them.

The matrix resin may be polysulfone, polyphenylsulfone, polyethersulfone, aromatic polyetherketone, polyetherimide, polyphenylene sulfide or a liquid crystal polyester.

A fiber-reinforced composite material is obtained by stacking such prepregs into a laminate and heating the matrix resin in a laminate under pressure. The heating of the matrix resin and baking of the F polymer may be carried out simultaneously.

Such a fiber-reinforced composite material may be laminated onto another substrate such as a metal substrate, a heat-resistant resin film or a prepreg as a precursor of such a fiber-reinforced composite material.

Such a fiber-reinforced composite material is suitable for applications which require strength, chemical resistance, flame retardance or shock absorption, such as the exteriors, interiors and structural components of transportation machines such as automobiles, motorcycles and aircraft, slide members such as gears and bearings, insulating parts, tension ropes, sports gear such as rackets and bats, components of industrial machines, robots and medical machines, oil drilling rigs, oil transfer hoses, hydrogen tanks, pressure vessels for hydrogen tanks, blades for wind turbine generator systems, liquid nitrogen tanks, motor rotating parts and the exterior and interior of compressor rotating parts.

A composite comprising a substrate and a baked product of the F polymer is obtained by applying the second present dispersion to the surface of the substrate as a coating and heating the coating.

Examples of such a composite are the same as those of the composite obtainable from the present dispersion, and its production method and applications are the same as those mentioned for a composite obtainable from the present dispersion.

Though the powder dispersion and composite of the present invention and their production are described above, the present invention is by no means restricted by the embodiments described above.

For example, the powder dispersion of the present invention may comprise an additional component which is not contained in the above-mentioned embodiments, or a functionally similar substitute for a certain component in the above-mentioned embodiments.

The method for producing a composite of the present invention may comprises an additional step for a certain purpose which is not included in the above-mentioned embodiments, or a functionally similar step in place of a certain step in the above-mentioned embodiments.

EXAMPLES

Now, the present invention will be described in further detail with reference to Examples. However, it should be understood that the present invention is by no means restricted thereto.
1. Components
[Powders]
Powder 1: powder (D50: 2.1 µm) of polymer 1 (melting temperature: 300° C.) comprising 97.9 mol % of TFE units, 0.1 mol % of NAH units and 2.0 mol % of PPVE units Powder 2: powder (D50: 1.8 µm) of polymer 2 (melting temperature: 305° C.) comprising 97.5 mol % of TFE units and 2.5 mol % of PPVE units Powder 3: powder (D50: 0.3 µm) of non-heat-fusible PTFE Polymer 1 and Polymer 2 have 1,000 carbonyl-containing groups and 40 carbonyl-containing groups, respectively, per $1×10^6$ carbon atoms in the main chain.
[Surfactants]
Surfactant 1: polyoxyalkylene-modified polydimethylsiloxane comprising dimethylsiloxane units in the main chain and oxyethylene groups in the side chains (weight average molecular weight: 1,600, variance: 1,5, HLB value: 13, static surface tension: 25 N/m, dynamic surface tension at 0.1 mass % in water: 30 mN/m)

Surfactant 2: polyoxyalkylene-modified polydimethylsiloxane having dimethylsiloxane units in the main chain and oxyethylene groups at the ends of the main chain (weight average molecular weight: 1,000, variance: 1.1, HLB value: 14, static surface tension: 25 mN/m, dynamic surface tension: 30 mN/m)

Surfactant 3: polyoxyalkylene-modified polydimethylsiloxane (weight average molecular weight: 4,000, variance: 2.1, HLB value: 16, static surface tension: 26 mN/m, dynamic surface tension: 35 mN/m)

Surfactant 4: polyoxyalkylene-containing polyorganolsiloxane (weight average molecular weight: 1,800, variance: 1.9, HLB value: 8, static surface tension: 30 mN/m, dynamic surface tension: 42 mN/m)

Surfactant 5: polyoxyalkylene-containing polyorganolsiloxane (weight average molecular weight: 1,700, variance: 1.8, HLB value: 19, static surface tension: 27 mN/m, dynamic surface tension: 36 mN/m)

Surfactant 6: polyethylene glycol trimethylnonyl ether

Surfactant 4 and Surfactant 5 are polyoxyalkylene-containing polyorganosiloxanes which are not polyoxyalkylene-modified polydimethylsiloxanes. Surfactants 1 to 6 are all nonionic compounds.
[Dispersion]
Dispersion 1: aqueous PTFE dispersion comprising 60 mass % of Powder 3 ("AD-911E" manufactured by AGC Inc.)
2. Preparation of Powder Dispersions Example 1

A pot loaded with Powder 1, Surfactant 1 and aqueous ammonia was tumbled over at 150 rpm for 1 hour with zirconia balls inside to obtain Composition 1. Another pot was loaded with Composition 1 and Dispersion 1 and tumbled over at 150 rpm for 1 hour with zirconia balls inside to obtain Powder dispersion 1 comprising Powder 1 (5 parts by mass), Powder 3 (45 parts by mass), Surfactant 1 (0.25 part by mass) and aqueous ammonia (47.5 parts by mass) and having a viscosity of 20 mPa·s and a pH of 10.

Examples 2 to 6

Powder dispersions 2 to 6 were obtained in the same manner as in Example 1 except that the powders and surfactant were changed as shown later in Table 1. In the row titled ammonia, "○" means that the powder dispersion comprises ammonia, and "−" means that the powder dispersion does not comprise ammonia.

Example 7

A pot loaded with Powder 1, Surfactant 1 and aqueous ammonia was tumbled over at 150 rpm for 1 hour with zirconia balls inside to obtain Powder dispersion 7 comprising Powder 1 (40 parts by mass), Surfactant 1 (2 parts by mass) and aqueous ammonia (58 parts by mass) and having a viscosity of 30 mPa·s and a pH of 10.

Examples 8 and 9

Powder dispersions 8 and 9 were obtained in the same manner as in Example 7 except that the surfactant was changed as shown later in Table 1.

Example 10

Powder dispersion 10 was obtained in the same manner as in Example 7 except that the surfactant was changed as shown later in Table 1, and aqueous ammonia was replaced by water.

Powder dispersions 1 to 3 changed in hue during long storage less than Powder dispersions 4 to 6. Powder dispersions 7 and 8 changed in hue during long storage less than Powder dispersions 9 and 10.

TABLE 1

| | Powder dispersion No. | | | | | | | | | |
| | 1 | 2 | 3 | 4 | 5 | 6 | 7 | 8 | 9 | 10 |
|---|---|---|---|---|---|---|---|---|---|---|
| Powder | 1 | 1 | 2 | 1 | 1 | 1 | 1 | 1 | 1 | 1 |
| | 3 | 3 | 3 | 3 | 3 | 3 | | | | |
| Surfactant | 1 | 2 | 1 | 3 | 4 | 5 | 1 | 2 | 3 | 2 |
| Ammonia | ○ | ○ | ○ | ○ | ○ | ○ | ○ | ○ | ○ | — |
| Liquid dispersion medium | water | water | water | water | water | water | water | water | water | water |

3. Production of Laminates (Composites)

Powder dispersion 1 was applied onto the surface of a long copper foil (18 μm thick) with a bar coater to form a liquid film, and the liquid film was dried to form a dry film by passing the copper foil with the liquid film through a drying oven at 120° C. for 5 minutes. Then, the dry film was heated at 380° C. for 3 minutes to obtain Laminate 1 comprising the copper foil and a baked polymer layer (5 μm thick) comprising a baked product of fused Powder 1 and Powder 3 on the surface.

Laminates 2 to 10 were produced in the same manner as Laminate 1 except that Powder dispersion 1 was changed to Powder dispersions 2 to 10, respectively.

4. Evaluation

4-1. Dispersion Stability of Powder Dispersions

Each powder dispersion was incubated in a vessel at 25° C. for 24 hours and visually examined for dispersion stability and rated on the following scale. The dispersion stability after 60 days of incubation was rated on the same scale.

[Ratings]

○: No aggregates were recognized visually.

Δ: Fine aggregates were visually recognized on the inner wall of the vessel and were able to be dispersed again uniformly upon gentle stirring.

×A sediment of aggregates was visually recognized on the bottom of the vessel and were able to be dispersed again uniformly upon stirring by shearing.

4-2. Foaming Resistance of Powder Dispersions

The foaming resistance of each powder dispersion was rated on the following scale based on the time required for foam disappearance measured during its production.

[Ratings]

○: Shorter than 3 hours

Δ: Not shorter than 3 hours and shorter than 6 hours

×: 6 hours or longer

4-3. Surface Smoothness of Laminates

The polymer layer of each laminate was visually examined from diagonally above with exposure of the polymer layer to light and rated for surface smoothness on the following scale.

[Ratings]

○: The entire surface of the polymer layer was smooth.

Δ: Blisters were observed on part of the surface of the polymer layer.

×Blisters were observed on the entire surface of the polymer layer.

The evaluation results are shown below in Table 2 together with physical properties (such as viscosity and pH) of the powder dispersions.

TABLE 2

| | | Powder dispersion or Laminate No. | | | | | | | | | |
| | | 1 | 2 | 3 | 4 | 5 | 6 | 7 | 8 | 9 | 10 |
|---|---|---|---|---|---|---|---|---|---|---|---|
| Physical properties or evaluation of powder dispersion | Viscosity [mPa · s] | 20 | 18 | 300 | 400 | 400 | 900 | 30 | 25 | 5500 | 25 |
| | pH | 10 | 10 | 10 | 10 | 10 | 10 | 10 | 10 | 10 | 7 |
| | Dispersion stability | ○ | ○ | Δ | X | Δ | X | ○ | ○ | X | ○ |
| | Foaming resistance | ○ | ○ | ○ | Δ | X | X | ○ | ○ | Δ | ○ |
| Evaluation of laminate | Surface smoothness | ○ | ○ | Δ | X | Δ | X | ○ | ○ | X | ○ |

Example 11

A pot loaded with Powder 1, Surfactant 1, Surfactant 6 and aqueous ammonia was tumbled over at 150 rpm for 1 hour with zirconia balls inside to obtain Powder dispersion 11 comprising Powder 1 (40 parts by mass), Surfactant 1 (2 parts by mass), Surfactant 6 (2 parts by mass) and aqueous ammonia (56 parts by mass) and having a viscosity of 30 mPa·s and a pH of 10. Laminate 11 was produced in the same manner as Laminate 1 except that Powder dispersion 11 was used instead of Powder dispersion 1. The dispersion stability and foaming resistance of Powder dispersion 11 and the surface smoothness of Laminate 11 were all rated as "○".

Example 12

The procedure in Example 11 was followed to obtain Powder dispersion 12 comprising Powder 1 (40 parts by mass), Surfactant 1 (0.5 part by mass), Surfactant 6 (3.5 parts by mass) and aqueous ammonia (56 parts by mass) and having a viscosity of 33 mPa·s and a pH of 10. Laminate 12 was produced in the same manner as Laminate 1 except that Powder dispersion 12 was used instead of Powder dispersion 1. The dispersion stability and foaming resistance of Powder dispersion 12 and the surface smoothness of Laminate 12 were all rated as "○".

The dispersion stabilities of Powder dispersions 7, 11 and 12 after 60 days of incubation at 25° C. were rated as "×", "○" and "○", respectively.

INDUSTRIAL APPLICABILITY

The powder dispersion of the present invention has good dispersion stability and handleability and a long storage life and can be used for production of a composite such as a laminate comprising a baked product having properties intrinsic to the F polymer or an impregnated product like sized fibers, a prepreg or a fiber-reinforced composite material. The composite of the present invention is useful as an antenna part, a printed wiring board, an aircraft part, an automobile part, sports gear, an item used in the food industry, a paint, a cosmetic product or the like. Specific examples of its application include wire coverings for aircraft wires, separation membranes like microfiltration membranes, ultrafiltration membranes, reverse osmosis membranes, ion exchange membranes, dialysis membranes and gas separation membranes, electrode binders for lithium secondary batteries, fuel cells and the like, slide members like load-bearing bearings, plain bearings, valves, bearings, toothed wheels, cam disks, belt conveyors and food belt conveyors, working tools like shovels, files and saws, electrical insulating tape, oil-drilling insulating tape, printed wiring board materials, copy rolls, furniture, automobile dashboards, covers for electric appliances, boilers, hoppers, pipes, ovens, baking molds, chutes, dies, toilets and container coverings.

This application is a continuation of PCT Application No. PCT/JP2021/031854, filed on Aug. 31, 2021, which is based upon and claims the benefit of priority from Japanese Patent Application No. 2020-148434 filed on Sep. 3, 2020, Japanese Patent Application No. 2020-211048 filed on Dec. 21, 2020, and Japanese Patent Application No. 2021-021811 filed on Feb. 15, 2021. The contents of those applications are incorporated herein by reference in their entireties.

What is claimed is:

1. A powder dispersion, comprising:
a powder of a tetrafluoroethylene polymer,
a liquid dispersion medium, and
a polyoxyalkylene-modified polydimethylsiloxane having a weight average molecular weight of from 500 to 3,000 and an HLB value of from 10 to 16 calculated by Griffin's equation,
wherein the powder dispersion contains no fluorinated surfactants.

2. The powder dispersion according to claim 1, wherein the polyoxyalkylene-modified polydimethylsiloxane has a static surface tension of at most 28 mN/m.

3. The powder dispersion according to claim 1, wherein the polyoxyalkylene-modified polydimethylsiloxane has a dynamic surface tension of at most 40 mN/m.

4. The powder dispersion according to claim 1, wherein a variance of molecular weight of the polyoxyalkylene-modified polydimethylsiloxane is less than 2.0.

5. The powder dispersion according to claim 1, wherein the polyoxyalkylene-modified polydimethylsiloxane has a degree of polymerization of from 2 to 100 for oxyalkylene groups and a degree of polymerization of from 2 to 100 for dimethylsiloxane.

6. The powder dispersion according to claim 1, wherein the polyoxyalkylene-modified polydimethylsiloxane comprises
a main chain containing dimethylsiloxane units and
one or more side chains containing oxyalkylene groups.

7. The powder dispersion according to claim 1, wherein the polyoxyalkylene-modified polydimethylsiloxane comprises
a main chain containing dimethylsiloxane units and
oxyalkylene groups at the ends of the main chain.

8. The powder dispersion according to claim 1, wherein the tetrafluoroethylene polymer comprises from 1 to 5 mol % of units based on perfluoro(alkyl vinyl ether) relative to all units contained therein and has a melting temperature of from 260 to 320° C.

9. The powder dispersion according to claim 1, which comprises a first powder of a polytetrafluoroethylene and a second powder of a tetrafluoroethylene polymer comprising from 1 to 5 mol % of units based on perfluoro(alkyl vinyl ether) relative to all units contained therein and having a melting temperature of from 260 to 320° C., wherein a ratio of the second powder to a sum of the first powder and the second powder is at most 25 mass %.

10. The powder dispersion according to claim 1, further comprising:
at least one nonionic surfactant selected from the group consisting of an ester surfactant, an ether surfactant, an ester ether surfactant, an alkanolamide surfactant, an alkyl glycoside, and a higher alcohol.

11. The powder dispersion according to claim 1, wherein the liquid dispersion medium comprises water.

12. The powder dispersion according to claim 11, which has a pH of from 6 to 12.

13. A powder dispersion, comprising:
a powder of a tetrafluoroethylene polymer,
a polyoxyalkylene-modified polydimethylsiloxane, and
a liquid dispersion medium comprising at least water,
wherein
the polyoxyalkylene-modified polydimethylsiloxane comprises a main chain containing dimethylsiloxane units,
the polyoxyalkylene-modified polydimethylsiloxane either comprises one or more side chains containing oxyalkylene groups or comprises oxyalkylene groups at the ends of the main chain, the polyoxyalkylene-modified polydimethylsiloxane has a weight average molecular weight of from 500 to 3,000 and an HLB value of from 10 to 16 calculated by Griffin's equation, and the powder dispersion contains no fluorinated surfactants and has a viscosity of less than 400 mPa·s.

14. A method for producing a composite comprising a substrate and a baked product, the method comprising:

applying the powder dispersion according to claim 1 to a surface of the substrate as a coating, and heating the coating to produce the baked product containing the tetrafluoroethylene polymer.

15. A method for producing a composite comprising a substrate and a baked product, the method comprising:

applying the powder dispersion according to claim 13 to a surface of the substrate as a coating, and heating the coating to produce the baked product containing the tetrafluoroethylene polymer.

16. The powder dispersion according to claim 1, wherein the polyoxyalkylene-modified polydimethylsiloxane has an HLB value of from 12 to 16 calculated by Griffin's equation.

17. The powder dispersion according to claim 13, wherein the polyoxyalkylene-modified polydimethylsiloxane has an HLB value of from 12 to 16 calculated by Griffin's equation.

\* \* \* \* \*